Patented Oct. 8, 1940

2,217,651

UNITED STATES PATENT OFFICE 2,217,651

HYDROGENATION OF ETHERS OF HYDROXY ALDEHYDES

Donald J. Loder, Wilmington, Del., assignor to E. I. du Pont de Nemours & Company, Wilmington, Del., a corporation of Delaware No Drawing. Application June 6, 1939, Serial No. 277,653

20 Claims. (Cl. 260—615)

This invention relates to the process for the hydrogenation of aldehyde-ethers and more particularly to the hydrogenation of the aldehyde group contained in glyceric aldehyde ethers to alcohol groups.

The materials treated in accord with the process of this invention have the generic formulas:

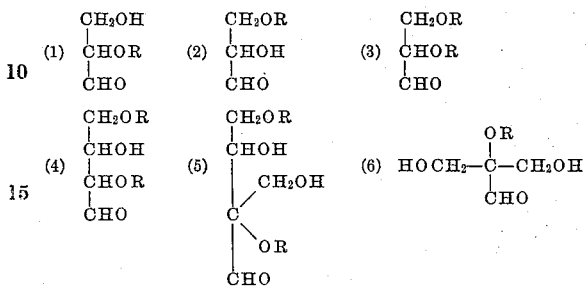

wherein R is an alkyl, aryl, aralkyl, alkoxy methylene or aryloxy methylene group. In the generic Formulas 3, 4 and 5, the R groups may be similar or dissimilar. Compounds conforming to Formula 5 may be prepared in accord with the process described by W. Fried (Monatsheftr 27, 1251-1257, 1906) while the compounds conforming to Formula 6 may be prepared by the process of A. Kluger (Monatsheftr, 26, 879–890, 1905). Hereinafter these compounds will be referred to as aldehyde-ethers. When hydrogenated in accord with the process of the present invention, the aldehyde group is converted to an alcohol group to give the corresponding glycerol-ethers or substituted glycerol-ethers:

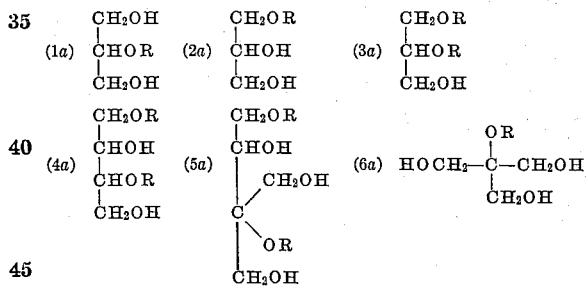

which may be designated broadly as glycerol ethers and specifically as: (1a) glycerol monobeta ether, (2a) glycerol monoalpha ether, (3a) glycerol alpha beta diether, (4a) erythritol alpha gamma diether, (5a) erythritol gamma hydroxy methyl alpha gamma diether and (6a) glycerol beta hydroxy methyl beta ether.

The process involves hydrogenating an aldehyde-ether to an ether, wherein the aldehyde group of the aldehyde-ether has been converted to the alcohol group. More specifically, the invention relates to the hydrogenation of glyceric aldehyde alpha methyl ether, $CH_2OH.CHOCH_3CHO$; glyceric aldehyde beta methyl ether, $$CH_2OCH_3.CHOH.CHO;$$

glyceric aldehyde alpha ethyl ether, $$CH_2OH.CHOC_2H_5.CHO;$$

glyceric aldehyde alpha propyl ether, $$CH_2OH.CHOC_3H_7.CHO;$$

glyceric aldehyde alpha (methoxy methyl) ether, $CH_2O.CH(OCH_2OCH_3).CHO$; glyceric aldehyde alpha (ethoxy methyl) ether, $$CH_2OH.CH(OCH_2OC_2H_5).CHO,$$

to obtain, respectively, as a result of the hydrogenation, glycerol beta-methyl ether, $$CH_2OH.CHOCH_3.CH_2OH;$$

glycerol alpha-methyl ether, $$CH_2OCH_3.CHOH.CH_2OH;$$

glycerol beta-ethyl ether, $$CH_2OH.CHOC_2H_5.CH_2OH;$$

glycerol beta-propyl ether, $$CH_2OH.CHOC_3H_7.CH_2OH;$$

glycerol beta (methoxy methyl) ether, $$CH_2OH.CH(OCH_2OCH_3).CH_2OH;$$

and glycerol beta (ethoxy methyl) ether, $$CH_2OH.CH_2(OCH_3OC_2H_5)CH_2OH.$$

Objects of the invention are indicated by the above description, which, broadly stated, provides a process for the hydrogenation of aldehyde ethers to ethers. Another object of the invention is to provide a liquid phase process for the hydrogenation of an ether-substituted polyhydroxy aldehyde such, for example, as alkyl, alkoxymethyl, etc. A more specific object involves the preparation of glycerol alpha-alkyl ethers by the hydrogenation of glyceric aldehyde alpha-alkyl ethers in the presence of a suitable hydrogenation catalyst. A still more specific object involves the preparation of glycerol beta-methyl ether by the hydrogenation of glyceric aldehyde alphamethyl ether in the presence of a suitable hydrogenation catalyst. Other objects and advantages of the invention will hereinafter appear.

The process of the present invention may be effected by the hydrogenation of the aldehyde-ethers utilizing suitable hydrogenation catalysts therefor. It is conducted at atmospheric pressure or above, generally at pressures ranging between 5 and 1000 atmospheres and preferably between 30 and 600 atmospheres, and at temperatures ranging between 50 and 200° C. and preferably between 75 and 175° C.

Various methods may be used in carrying out the hydrogenation reaction, for example, the glyceric aldehyde-ether, together with a suitable catalyst and an oxygenated organic solvent, e. g. methanol, ethanol, propanol and higher alcohols, as well as ethers, esters, etc., may be placed in an autoclave provided with adequate stirring means and hydrogen pumped in to give the desired pressure. The autoclave and contents are then heated to temperature and with stirring the reaction is continued until the hydrogen adsorption has substantially ceased.

Various catalysts may be used for carrying out this process such, for example, as the fused, mixed metal oxide catalysts disclosed in the pending application of A. T. Larson, S. N. 171,894, filed October 30, 1938, which describes copper catalysts promoted or unpromoted with one or more metal oxides. Other catalysts adopted for the process are those that may be classified as metal hydrogenation catalysts or their oxides which may be promoted by the presence of a more acidic metal oxide, especially where the more acidic metal oxide is chromium oxide; copper chromite is an example of this class of catalysts. Any effective hydrogenating catalyst, however, may be used, for example, as the nickel catalysts well known to the arts.

The more detailed practice of the invention is illustrated by the following examples in which parts are by weight unless otherwise stated. There are, of course, many forms of the invention other than these specific embodiments.

*Example 1.*—A high pressure shaker tube was charged with 51.3 parts of crude glyceric aldehyde alpha-methyl ether which was prepared by the condensation of methoxy acetaldehyde with formaldehyde at a temperature of approximately 35°, 28.5 parts of water, 14.5 parts of methanol and 0.5 part of sodium hydroxide. The temperature of the tube and contents was raised to between 80 and 120° C. and hydrogen introduced to give a pressure of approximately 600 atmospheres. The reaction was continued until the absorption of hydrogen substantially ceased, whereupon the hydrogen pressure was released, the product distilled under vacuum after first stripping the methanol, and the product, glycerol beta-methyl ether, was obtained in good yields.

*Example 2.*—A high pressure shaker tube was charged with a mixture of 40 parts of crude glyceric aldehyde alpha-(methoxymethyl) ether which was prepared by the condensation of methoxy methoxy acetaldehyde with formaldehyde at a temperature of 35° C., 40 parts of water, 60 parts of methanol; about 2% by weight of the charge of solid MgCO₃, and an active nickel hydrogenation catalyst, (prepared by precipitating nickel oxide on kieselguhr followed by reduction with hydrogen). The temperature of the tube and contents was raised to a temperature of 100 to 125° C. and hydrogen introduced to give a pressure of approximately 700 atmospheres. The reaction was continued until the absorption of hydrogen substantially ceased; the hydrogen pressure released and the product separated from the catalyst and distilled in vacuo after first stripping off methanol. The product, glycerol beta-(methoxymethyl) ether, was obtained in good yields. The crude product, which was substantially all glycerol beta-(methoxymethyl) ether, boiled at 124–129° C. at 8 mm. pressure.

*Example 3.*—A high pressure shaker tube was charged with 45 parts of 3-hydroxy-2,4-dimethoxy butyraldehyde,

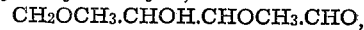

100 parts of water and 10% by weight of an active nickel hydrogenation catalyst. (The 2-hydroxy-1,3-dimethoxy butyraldehyde was prepared by condensation of methoxy acetaldehyde in aqueous solution at pH 9-9.5 and 25-30° C.). Hydrogen was introduced and the hydrogenation conducted at a temperature between 100 and 125° C. and at a pressure of between 600 and 700 atmospheres. When absorption of hydrogen had substantially ceased, the product was discharged, filtered from the catalyst and distilled. Erythritol-1,3-dimethyl ether,

was obtained in 75% yield. The erythritol-1,3-dimethyl ether has the following characteristics: boiling point 123° C. at 10 mm. pressure, $n_D$ 1.4497 at 25° C., specific gravity 1.115 at 16° C., hydroxyl number—found 747, theory 748.

It has been indicated that various hydrogenation catalysts may be used for effecting this reaction, but it has been found, in addition, that when the reaction product contains formaldehyde, as in the case when the crude aldehydes described above are used, the pH value of the aldhyde reaction mixture should preferably be maintained within the range of 7.5 to 9 with or without the addition of methanol as a solvent. It has been found that various compounds such, for example, as magnesium carbonate, disodium phosphate and sodium hydroxide can be used to convert the pH value of the hydrogenating bath to within this range.

The products prepared in accord with this invention are useful as solvents for cellulose derivatives, as intermediates for the preparation of oxygenated organic compounds, and as the major constituent of hydraulic fluids.

From a consideration of the above specification, it will be realized that many changes may be made in the details therein given without departing from the invention or sacrificing any of the advantages that may be derived therefrom.

I claim:

1. A process for the preparation of a polyhydric alcohol-ether which comprises hydrogenating to an alcohol group the aldehyde group of an ether-substituted glyceric aldehyde.

2. A process for the preparation of a glycerol-ether which comprises hydrogenating to an alcohol group the aldehyde group of a glyceric aldehyde monoalkyl ether.

3. A process for the preparation of a glycerol-ether which comprises hydrogenating to an alcohol group the aldehyde group of a glyceric aldehyde dialkyl ether.

4. The process of claim 1 conducted in the presence of a hydrogenation catalyst.

5. The process of claim 1 conducted in a reaction medium, containing formaldehyde, the pH value of the medium ranging between 7.5 and 9.

6. The process of claim 1 conducted at a temperature between 50 and 200° C.

7. The process of claim 1 conducted at a pressure between 5 and 1000 atmospheres.

8. A process for the preparation of a glycerol ether which comprises hydrogenating in the liquid phase and to an alcohol group, the aldehyde group of an ether substituted glyceric aldehyde, the hydrogenation being conducted in the presence of a hydrogenation catalyst.

9. A process for the preparation of a glycerol ether which comprises hydrogenating in the liquid phase and to an alcohol group, the aldehyde group of an ether substituted glyceric aldehyde, in the presence of a hydrogenation catalyst.

10. The process for the preparation of a dihydric alcohol ether which comprises hydrogenating in the liquid phase to an alcohol group the aldehyde group of an ether substituted dihydroxy acid aldehyde, the hydrogenation being effected at a temperature between 50 and 200° C. and a pressure between 500 and 1000 atmospheres.

11. A process for the preparation of a polyhydric alcohol-ether which comprises, hydrogenating in a monohydric aliphatic alcohol solvent, the aldehyde group of an aldehyde-ether to an alcohol group.

12. A process for the preparation of a glycerol ether which comprises hydrogenating in an aqueous solution of a monohydric aliphatic alcohol solvent, the aldehyde group of a glyceric aldehyde alkyl ether to an alcohol group to give a glycerol ether.

13. The process of claim 12 conducted in an aqueous solution of an oxygenated organic solvent having a pH value between 7.5 and 9.

14. A process for the preparation of glycerol beta-methyl ether which comprises hydrogenating in an aqueous methanol solution glyceric aldehyde alpha-methyl ether at a temperature between 50 and 200° C. and a pressure between 5 and 1000 atmospheres.

15. A process for the preparation of glycerol beta-(methoxy methyl) ether which comprises hydrogenating in an aqueous methanol solution glyceric aldehyde alpha (methoxy methyl) ether at a temperature between 50 and 200° C. and a pressure between 5 and 1000 atmospheres.

16. A process for the preparation of erythritol-1,3-dimethyl ether which comprises hydrogenating in an aqueous methanol solution 2-hydroxy-1,3-dimethoxy butyraldehyde in water containing a nickel hydrogenation catalyst at a temperature between 50° and 200° C. and at a pressure between 5 and 1000 atmospheres.

17. Glycerol beta-alkoxy methyl ether.

18. Glycerol beta-methoxy methyl ether.

19. Erythritol-1,3-dimethyl ether.

20. A new compound selected from the group consisting of glycerol beta-alkoxy alkyl ethers, and erythritol-1,3-dimethyl ether.

DONALD J. LODER.